United States Patent
Bera

(10) Patent No.: US 6,745,215 B2
(45) Date of Patent: Jun. 1, 2004

(54) COMPUTER APPARATUS, PROGRAM AND METHOD FOR DETERMINING THE EQUIVALENCE OF TWO ALGEBRAIC FUNCTIONS

(75) Inventor: Rajendra Kumar Bera, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 442 days.

(21) Appl. No.: 09/839,025

(22) Filed: Apr. 20, 2001

(65) Prior Publication Data

US 2003/0018671 A1 Jan. 23, 2003

(51) Int. Cl.[7] ............................... G06F 7/00; G06F 7/50
(52) U.S. Cl. ........................................ 708/200; 708/671
(58) Field of Search ................................ 708/200, 671; 340/146.2

(56) References Cited

U.S. PATENT DOCUMENTS 6,032,144 A * 2/2000 Srivastava et al. ............. 707/3
6,061,676 A * 5/2000 Srivastava et al. ............. 707/3

* cited by examiner

*Primary Examiner*—Tan V. Mai
(74) *Attorney, Agent, or Firm*—T. Rao Coca; Manny Schecter; Anthony V. S. England

(57) ABSTRACT

In a compiler or program proving or verification software code, it is often useful to analyse a computer program and one way in which this might be partially achieved is by comparing algebraic expressions to see if they are equivalent, i.e. to see if they are derivable from a common template or function definition. Herein a string matching and replacement algorithm is used to compare two functions. Initially, each expression is converted to a "reduced" form by reference to a set of standard rules so as, for example, to ensure that terms comprising the same variables are combined. The variables names in each term are then replaced with symbols to produce, for each expression, a corresponding character string which, arranged in a predetermined order, are compared to determine equivalence of the expressions. To achieve this, a matrix M is formed with entries corresponding to the symbols and the matrix elements are incremented according to pre-set rules. The matrix is then processed to identify equivalence.

10 Claims, 4 Drawing Sheets

COMPUTER APPARATUS, PROGRAM AND METHOD FOR DETERMINING THE EQUIVALENCE OF TWO ALGEBRAIC FUNCTIONS

BACKGROUND OF THE INVENTION

The present invention relates to the determination of the equivalence of two algebraic functions, such as those used in computer programs. The present invention includes a method and apparatus for carrying out such a determination and also to a computer program product including a computer readable medium having recorded thereon a computer program for performing such determination.

The present invention has, for its object, a technique which is specifically relevant to the determination of whether or not two algebraic expressions share a common template or function definition. Expressed mathematically, the objective is applicable as follows.

Given an algebraic expression $f(x_1, x_2, \ldots, x_n)$ of n-variables denoted by the symbol set $\{x_1, x_2, \ldots, x_n\}$ and another expression $g(y_1, y_2, \ldots, y_n)$ of n-variables denoted by the symbol set $\{y_1, y_2, \ldots, y_n\}$ determine if there exists a permutation σ of degree n on the set $\{y_1, y_2, \ldots, y_n\}$ such that $$g(y_1, y_2, \ldots, y_n) = f(\sigma(y_1), \sigma(y_2), \ldots, \sigma(y_n)), n>0$$

where $x_1 = \sigma(y_1), x_2 = \sigma(y_2), \ldots, x_n = \sigma(y_n)$.

An identity would imply that f( ) and g( ) share a common template or function definition as mentioned earlier. The term "permutation" is defined as follows.

Let Ω be a set consisting of n distinct objects, which we may denote either by digits or by letters, say $$\Omega = \{1, 2, \ldots, n\}.$$

Then a permutation on Ω implies the mapping of objects 1 to n to the same objects but in a different order—this is called mapping of Ω onto itself. A permutation σ of degree n is an operation on the set Ω which maps the digit i to the digit σ(i) in such a way that σ(i)≠σ(j) when i≠j. We write $$\sigma = \begin{pmatrix} 1 & 2 & \ldots & n \\ \sigma(1) & \sigma(2) & \ldots & \sigma(n) \end{pmatrix}$$

where the numbers σ(1), σ(2), ..., σ(n) are an arrangement of the numbers 1, 2, ..., n.

Note that since there are n! distinct arrangements possible of n objects, there are n! distinct permutations in the form given above. For example, the permutation of degree 5 given by $$\sigma = \begin{pmatrix} 1 & 2 & 3 & 4 & 5 \\ 3 & 5 & 4 & 1 & 2 \end{pmatrix}$$

in which σ(1)=3, σ(2)=5 ..., σ(5)=2, may equally well be written in the form $$\sigma = \begin{pmatrix} 4 & 2 & 3 & 1 & 5 \\ 1 & 5 & 4 & 3 & 2 \end{pmatrix}$$

SUMMARY OF THE INVENTION

The invention comprises a method, apparatus and program product for determining the equivalence of two algebraic functions. In the invention, an algorithm is involved which comprises determining the symbol sets of the two functions; forming a matrix having a row for each symbol of one function and a column for each symbol of the other function; subjecting the functions to predetermined tests and incrementing the elements in the matrix in accordance with the results of said tests; and testing the matrix against predetermined rules for the symmetry of the matrix.

The algorithm may include comparing said symbol sets to determine whether they contain the same numbers of symbols.

The invention further provides a method, program and apparatus for determining the equivalence of two algebraic functions f( ) and g( ) having respective symbol sets $\{x_1, x_2, \ldots, x_n\}$ and $\{y_1, y_2, \ldots, y_n\}$ having equal numbers of symbols, the method comprising the steps of forming a matrix M with n rows and n columns and made up of elements $M_{ij}$ corresponding to respective pairs of said symbols $x_i$ and $y_j$ where $M_{ij}$ is calculated by initialising the values of $M_{ij}$ to zero; putting $x_i=0$ in f( ) and $y_j=0$ in g( ) and replacing each other variable in f( ) and g( ) with a predetermined string character, then arranging the terms of f( ) and g( ) in ASCII order and comparing them and, if they match, incrementing the current value of $M_{ij}$; putting $x_i=1$ in f( ) and $y_j=1$ in g( ) and replacing each other variable in f( ) and g( ) with a predetermined string character, then arranging the terms of f( ) and g( ) in ASCII order and comparing them and, if they match, incrementing the current value of $M_{ij}$; putting $x_i=-1$ in f( ) and $y_j=-1$ in g( ) and replacing each other variable in f( ) and g( ) with a predetermined string character, then arranging the terms of f( ) and g( ) in ASCII order and comparing them and, if they match, incrementing the current value of $M_{ij}$; ensuring that every element $M_{ij}$ is either a zero or a three and that each row of the matrix M contains at least one three; for each entry $M_{ij}$ which has the value three, exchanging the contents of columns i and j one with another; and inspecting the matrix M with the exchanged columns to determine if it is symmetrical.

The method and apparatus may further comprise analysing computer code containing first and second algebraic functions $f(x_1, x_2, \ldots, x_n)$ and $g(y_1, y_2, \ldots, y_n)$, the method being operable for analysing a relationship between said first and second functions and comprising the steps of:

(a) in each term in each function, replacing each variable name in that term with a predetermined symbol to form two character strings F( ) and G( ) each composed of sub-strings corresponding to respective terms of the respective function;

(b) arranging the sub-strings of each string in a like predetermined order; and (c) comparing the strings one with another to determine equivalence of the two functions.

Preferably, the method further includes taking each variable $x_i$ of the first function $f(x_1, x_2, \ldots, x_n)$ and running through variables $y_j$ of the second function $g(y_1, y_2, \ldots, y_n)$ one-by-one and carrying out the steps of:

(a) removing all the terms in the first function which contain $x_i$ and all the terms in the second function which contain $y_j$ and, in each remaining term of each function, replacing each variable with a predetermined symbol and rearranging said terms in a predetermined order to form two character strings $f_0( )$ and $g_0( )$;

(b) replacing each variable $x_i$ and $y_j$ by the value 1, replacing each remaining variable with a single predetermined symbol, and rearranging the terms of the functions in a predetermined order as two character strings $f_1( )$ and $g_1( )$;

(c) replacing each variable $x_i$ and $y_j$ by the value $-1$, replacing each remaining variable with a single predetermined symbol, and rearranging the terms of the functions in a predetermined order as two character strings $f_{-1}(\ )$ and $g_{-1}(\ )$;

(d) carrying out respective character string matching operations to determine if $f_0(\ )$ is identical to $g_0(\ )$, if $f_1(\ )$ is identical to $g_1(\ )$, and if $f_{-1}(\ )$ is identical to $g_{-1}(\ )$.

BRIEF DESCRIPTION OF THE DRAWINGS

For a better understanding of the invention, reference will be made, by way of example, to the accompanying drawings, in which.

DETAILED DESCRIPTION

Figure 1:
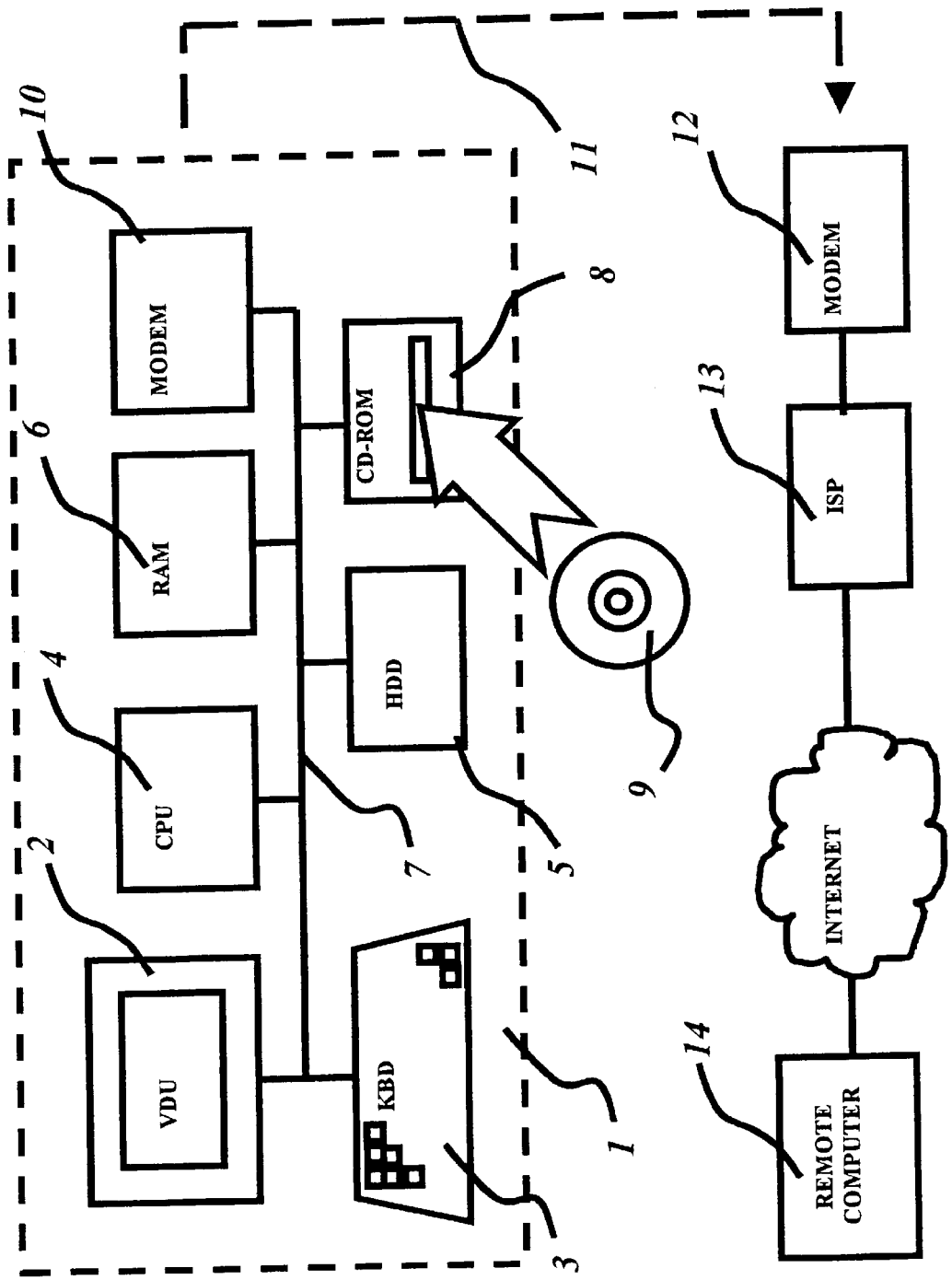
FIG. 1 is a simplified diagram of a computer system.

The invention comprises a method for determining the equivalence of two algebraic functions. The method may be implemented as a program for a computer, and the program may be stored on a storage medium, for example a CD-ROM, to form a program product according to the invention. Alternatively, a program product according to the invention may comprise a program made available for downloading from another computer. The computer program can be loaded into or made available to a suitable computer to form a computer system of the invention. FIG. 1 shows one embodiment of such a computer system.

This embodiment comprises a so-called stand-alone computer, i.e. one that is not permanently linked to a network. It includes a display monitor 2, a keyboard 3, a microprocessor—based central processing unit 4, a hard-disc drive 5 and a random access memory 6 all coupled one to another by a connection bus. The keyboard 3 is operable for enabling the user to enter commands into the computer along with user data. As well as keyboard 3, the computer may comprise, a mouse or tracker ball (not shown) for entering user commands especially if the computer is controlled by an operating system with a graphical user interface.

To load program instructions into the memory 6 and/or store them on the disc drive 5 so that the computer begins to operate or to become operable in accordance with the present invention, the computer 1 comprises a CD-ROM drive 8 for receiving a CD-ROM 9.

The program instructions are stored on the CD-ROM 9 from which they are read by the drive 8. However, as will be well understood by those skilled in the art, the instructions as read by the drive 8 may not be usable directly from the CD-ROM 9. Instead, they may be loaded into the memory 6 and stored in the hard disc drive 5 and used by the computer 1 from there. Also, the instructions may need to be decompressed from the CD-ROM using appropriate decompression software on the CD-ROM or in the memory 6 and may, in any case, be received and stored by the computer 1 in a sequence different to that in which they are stored on the CD-ROM.

In addition to the CD-ROM drive 8, or instead of it any other suitable input means could be provided, for, example a floppy-disc drive or a tape drive or a wireless communication device, such as an infrared receiver (none of these devices being shown).

The computer 1 also comprises a telephone modem 10 through which the computer is able temporarily to link up to the Internet via telephone line 11, a modem 12 located at the premises of an Internet service provider (ISP), and the ISP's computer 13. Also connected to the Internet are many remote computers, such as the computer 14, from which information, software and other services are available for downloading to the computer 1. Furthermore, the computer 1 does not have to be in a stand-alone environment. Instead, it could form part of a network (not shown) along with other computers to which it is connected on a permanent basis. It could also be permanently coupled to or have a temporary link to an intranet. An intranet is a group of data holding sites similar to Internet sites and arranged in the same way as the Internet but accessible only to particular users, for example the employees of a particular company. Instead of modem 10, the computer 1 could have a digital hard-wired link to the ISP's computer 13 or the computer 1 could itself comprise a permanently connected Internet site whether or not acting as an ISP for other remote users. Instead of the invention being usable only through the local keyboard 3, it may be available to remote users working through temporary or permanent link to computer 1 acting as ISP or simply as an Internet site.

Thus, instead of being provided by a local device such as the CD-ROM drive 8, the program instructions could be received or made available via the Internet from a remote computer such as the computer 14. Alternatively, the instructions could be received or made available from a computer connected with computer 1 via a network such as an intranet.

One embodiment of the method of this invention comprises a template matching algorithm to decide if two given algebraic expressions are derivable from a common expression template. Its possible applications include compiler-initiated optimisation of programs with common expression templates, and in the development of program/theorem proving techniques.

Thus, to perform the algorithm, the computer 1 is loaded with a suitable operating system, a compiler including a section for carrying out the equivalence determining algorithm, or simply a specific utility for carrying out that algorithm, and a section of source code which, it is assumed, contains the two expressions of which the equivalence is to be determined. The compiler/utility is supplied to computer 1 from a portable storage medium such as a series of floppy discs (not shown) or a CD-ROM or from another computer such as the computer 14. The algorithm will now be described by reference to the two flow charts of FIGS. 2A, 2B (FIG. 2B being a continuation of FIG. 2A) and 3. The numbered "steps" noted herein correspond to the step numbers of the flow charts.

Figure 2A:
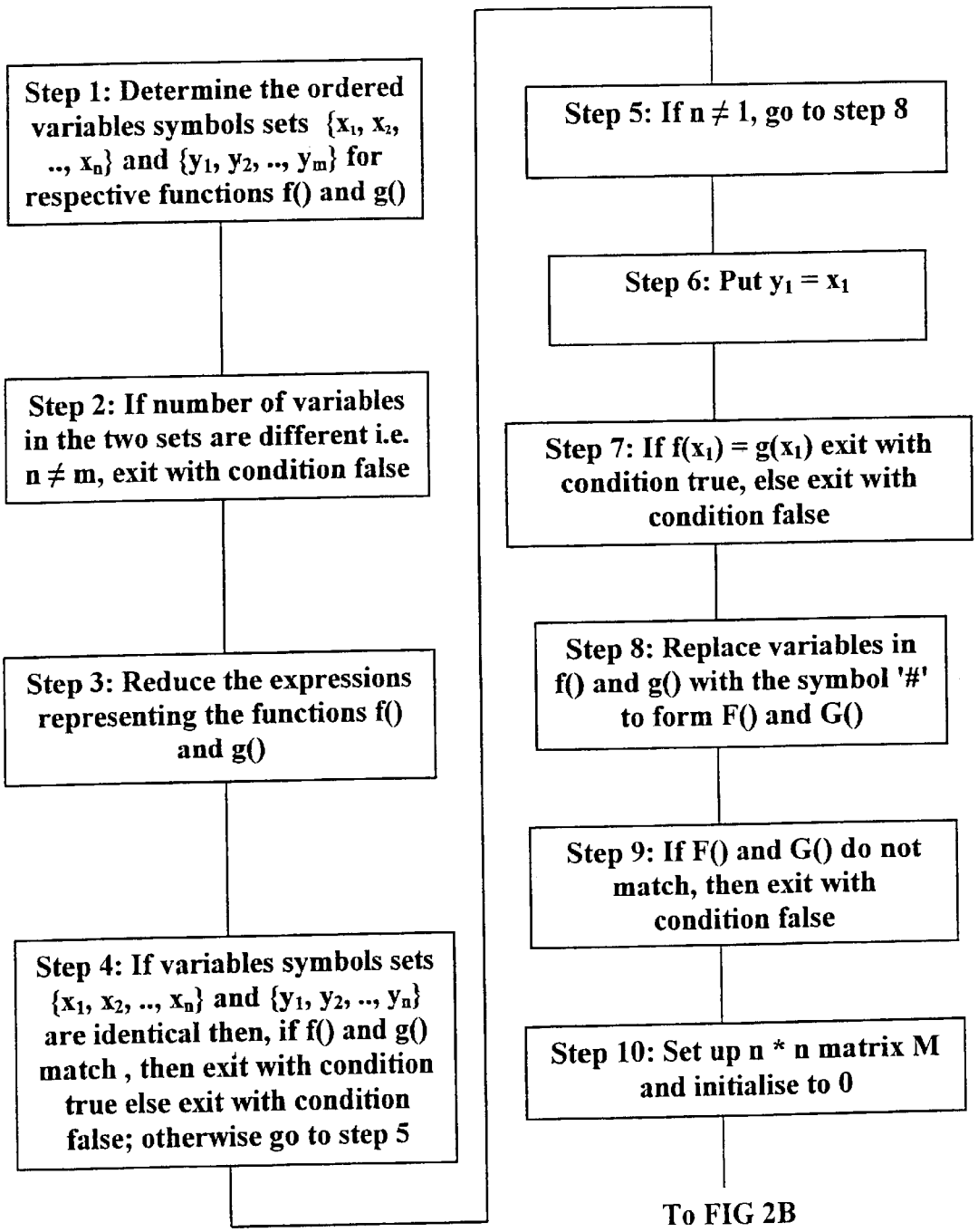
FIGS. 2A, 2B and 3 are flow-charts for explaining the method of the invention.

Referring first to FIG. 2A, the two expressions $f(\ )$ and $g(\ )$ to be compared are identified in the relevant source code and then:

Step 1: Determine the Ordered Variables Symbol Sets

The expressions are parsed to identify the respective symbol sets and, in each set, the symbols are arranged in ASCII order (either ascending or descending). Say that the symbol set for $f(\ )$ is $\{x_1, x_2, \ldots, x_n\}$ and the set for $g(\ )$ is $\{y_1, y_2, \ldots, y_m\}$.

Step 2: Check for Same Number of Symbols in Each Set

The respective numbers of symbols n and m in the two sets are compared and, if they are not the same, i.e. if n is not equal to m, the algorithm is exited, i.e. the method is abandoned. This is because the two expressions obviously cannot then be equivalent, i.e. they cannot then represent the same function. If n and m are the same, the method proceeds to Step 3.

Step 3: Reduce the Expressions

To facilitate the comparison of the two expressions, each is now reduced to a standardised format according to a predetermined set of rules.

Figure 3:
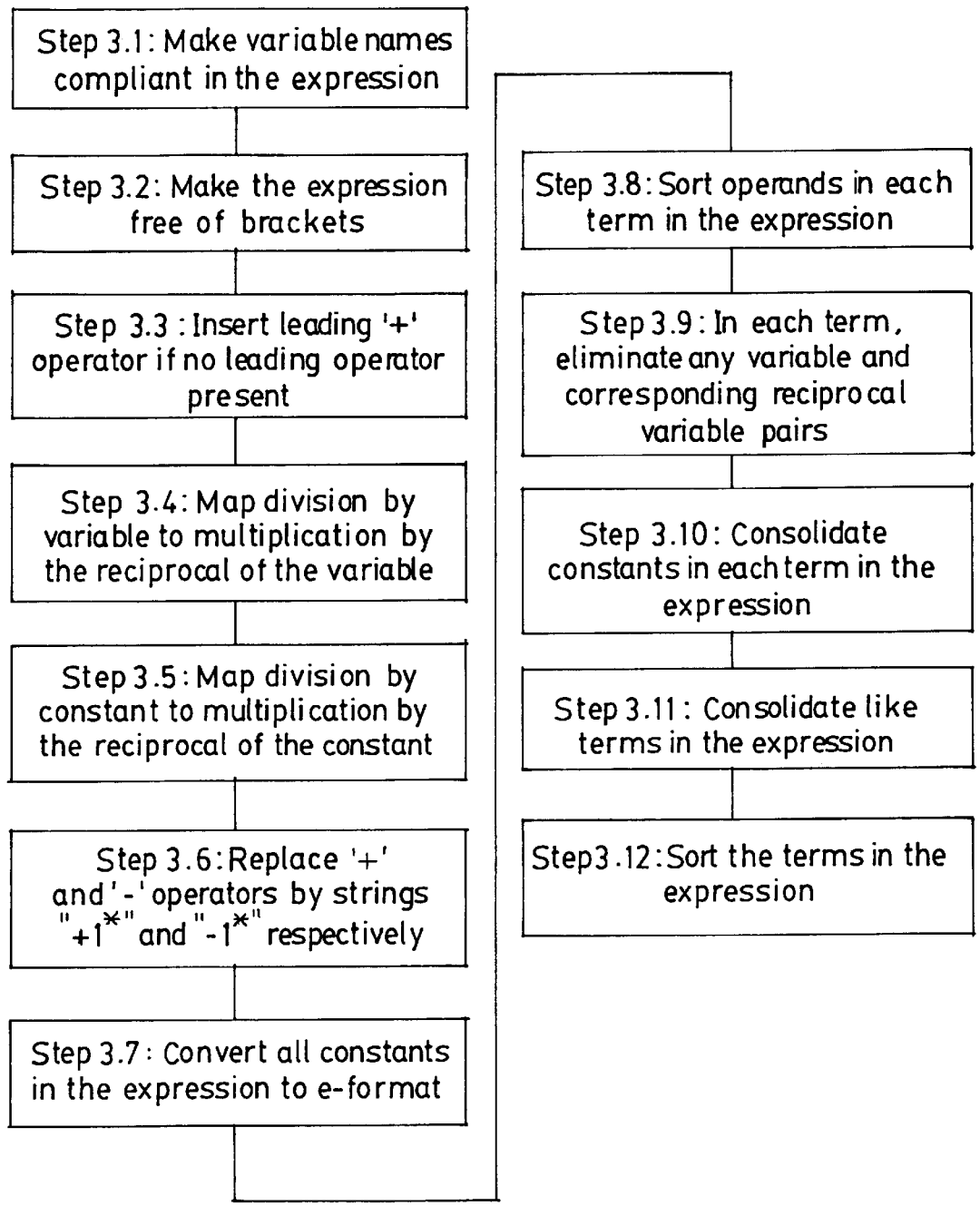

This reduction operation, i.e. Step 3 of the algorithm, comprises a series of sub-operations or steps which will now be described with reference to FIG. 3.

Step 3.1: Make Variable Names Compliant

Initially, it is assumed that the expression to be converted is syntactically correct and does not contain any blanks. In the preferred embodiment, variable names appearing in the expression may comprise only lower-case alphabet characters, the underscore character, and digits. Also, a variable name may not start with a digit or end with an underscore. If these construction rules are not met, then the affected variable names are mapped (aliased) to alternative, but distinct, names obeying the construction rules, and these new names used instead.

Step 3.2: Remove Brackets

Brackets, if present, in the expression must be removed by carrying out the necessary operations needed to remove them, such as multiplying two parenthesised factors, discarding superfluous brackets, and so on.

Step 3.3: Insert Leading Operator if None Present

The expression is put in the following form:

<unitary operator><operand><operator><operand>. . . . <operator><operand> where the unitary operator is either + (plus) or − (minus), and each operator is one of + (plus), − (minus), * (multiplication) or / (division). In the event that an expression does not commence with a unitary operator, one is added, i.e. a unitary operator + (plus) is inserted at the start of the expression. For example:

a*b/c becomes +a*b/c

Step 3.4: Map Division by Variable to Multiplication by Reciprocal of Variable

Division by a variable, for example the operator-operand pair /x, is replaced by multiplication by the reciprocal of the variable, where the reciprocal of the variable is formed as a new variable by appending an underscore to the variable, i.e. /x is replaced by *x_ in the case of the given example.

Step 3.5: Map Division by Constant to Multiplication by Reciprocal of Constant

Division by a constant, for example /5, is replaced by multiplication by the reciprocal of the constant, i.e. /5 is replaced by *0.2 in the case of the given example.

Step 3.6: Replace "+" and "−" by Strings "+1*" and "−1*"

Next all + (plus) operators are substituted with the string "+1*" so that "+" becomes "+1*". Similarly, all − (minus) operators are substituted with the string "−1*" so that "−" becomes "−1*". Thus, for example:

+x becomes +1*x and

−x*y+z becomes −1*x*y+1*z

Step 3.7: Convert Constants to e-format

Next the operands, which are constants (including the 1's introduced in the previous step) are converted into an e-format as follows:

".[unsigned number]e[e-sign][unsigned exponent]"

where: [unsigned number] is a n-digit number comprising only digits and n is a predetermined fixed integer greater than 0; [e-sign] is the sign of the exponent and is one of > for plus or < for minus; and [unsigned exponent] is a m-digit number comprising only digits and m is a predetermined fixed integer greater than 0.

Thus, for example:

$25 = 0.25*10^2$ becomes 0.250000e>02 and $0.025 = 0.25*10^{-1}$ becomes 0.250000e<01 where we have assumed n=6 and m=2. It is noted that any constant will be represented by a string of constant length m+n+3 characters in the e-format. Here e[e-sign] [unsigned exponent] represents the quantity 10 raised to the power [e-sign] [unsigned exponent], which must be multiplied to the number represented by. [unsigned number] to get the actual constant.

Now, the expression is free of the division operator and will contain at least one operand which is a constant. Each term in this expression will therefore have the following form:

<unitary operator><operand><*><operand>. . . <*><operand> where the unitary operator is either + (plus) or − (minus), and between two consecutive operands is the multiplication operator *. After the terms are identified, the [e-sign] of each constant is restored from < or > to − or + respectively.

Step 3.8: Sort Operands in Each Term

In each term the operands are sorted (rearranged) in ascending order according to their ASCII value. This rearrangement is entirely permissible because the multiplication operator is commutative, i.e. the exchange of operands does not affect the result.

It is noted that no other variable will be able to place itself in the rearrangement between any particular variable and its reciprocal if they are both present. For example, if the variable "a" and its reciprocal "a_" are both present, they will be sorted so as to remain together as "*a*a_".

Step 3.9: Eliminate Variable/Reciprocal Pairs

Next, all operator-operand sequences of the form "*a*a_" are eliminated from the term. An expression, such as, $a^3/a^2$ will appear as "*a*a*a*a_*a_". After "*a*a_" has been eliminated from it, "*a*a*a_" will remain, from which "*a*a_" must, again, be eliminated. That is, the elimination process must be continued till no further elimination is possible.

Step 3.10: Consolidate Constants in Each Term

After the sorting step 3.8, the operands, which are constants in the term will be bunched up at the beginning of the terms where they can be easily identified and replaced by a single constant. Thus, for example:

+0.100000e+01*s*k*m*s_*0.500000e+00 after arranging the operands in ascending order becomes

+0.100000e+01*0.500000e+00*k*m*s*s_ and after eliminating the variables s and s_ and consolidating the constants, the term becomes +0.500000e+00*k*m At this stage a term will have the following form:

<unitary operator><constant><*><operand>. . . <*><operand> where each operand is a variable name, whose ASCII value is not lower than that of its preceding operand, if any. This is the reduced form of a term. In the reduced form, the non-constant part of a term is called a variable-group. For example, if the term in the reduced form is "+0.250000e+01*m*m*s", then its variable-group is "*m*m*s".

Step 3.11: Consolidate Like Terms

In an expression, all those terms whose variable-groups match, are combined by modifying the constant in one of the terms, and eliminating the others.

Step 3.12: Sort Terms in the Expression

Finally, the reduced terms in the expression are rearranged in an ascending order according to the ASCII value of their respective variable-groups. In this final form, the expression is said to be in its reduced form. Note, in particular, that no two terms in a reduced expression will have the same variable-group.

Henceforth, references to the expressions f( ) and g( ) refer to the reduced form of those expressions.

Figure 2B:
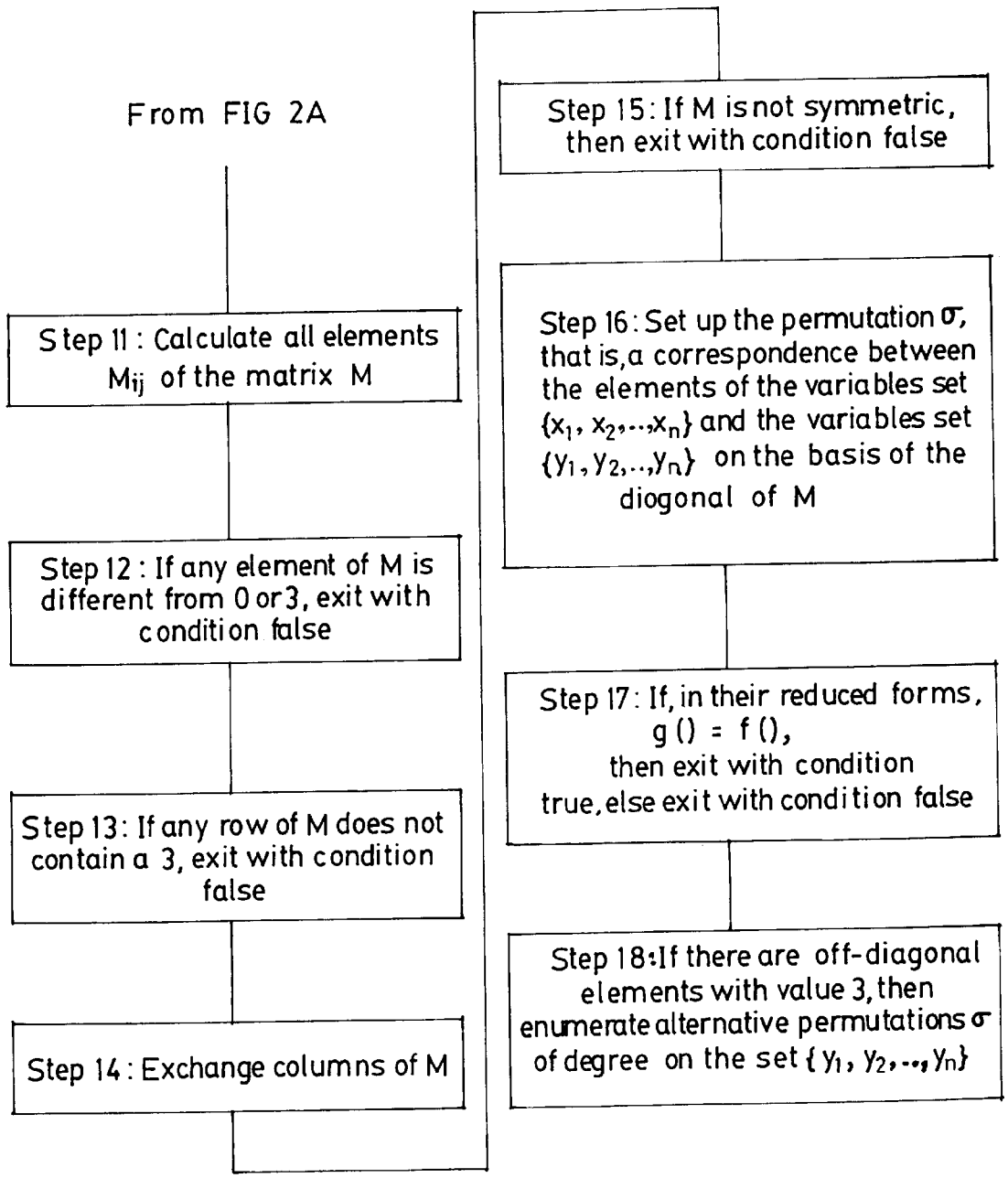

Returning now to FIG. 2A and then its continuation FIG. 2B, the analysis algorithm then continues with the following steps:

Step 4: Are Variables Symbols Sets Identical?

If the variables in the two ordered sets $\{x_1, x_2, \ldots, x_n\}$ and $\{y_1, y_2, \ldots, y_n\}$ are identical (that is, for each i=1 to n, $x_i$ and $y_1$ have identical symbols) then a simple string match between the reduced strings of f( ) and g( ) will tell us if f( )=g( ) or not. If the strings match then f( )=g( ), else not; and the algorithm ends. If the variable sets are not identical, g( ) to Step 5.

Step 5: Is n=1?

If n is not equal to 1 go to Step 8.

Step 6: Put $y_1=x_1$

Put $y_1=x_1$ in g( ) to form $g(x_1)$.

Step 7: Compare $f(x_1)$ and $g(x_1)$

If $f(x_1)=g(x_1)$ exit with condition true, else exit with condition false. Steps 6 and 7 only apply to the case where n=1, i.e. where two expression each have only one variable. The comparison indicates whether or not the expressions are the same and the method then terminates.

Step 8: Reference Variables

This and the following steps are carried out where n is not equal to 1. Replace each of the variables in f( ) with the symbol #, and rearrange the terms (sign included), treating them as character strings, in ascending (or, descending) order. Call this new string F( ). Likewise create G( ) from g( ).

Step 9: Compare F( ) and G( )

If the strings F( ) and G( ) do not match, then f( )≠g( ) and the algorithm ends, i.e. exit with condition false. If they match, g( ) to the next step. Note that replacing each variable by the symbol # makes all variables have the same character count. Hence if the strings F( ) and G( ) do not match, it can be definitely concluded that f( ) and g( ) cannot be identical. However, if they match, we cannot yet conclude that f( ) and g( ) are identical.

Step 10: Set Up Matrix M

Set up a square table of n rows and n columns, with the columns labelled $y_1, y_2, \ldots, y_n$, and the rows labelled $x_1, x_2, \ldots, x_n$. Call this matrix M. Let an element in this matrix corresponding to $x_i$ and $y_j$ be designated by $M_{ij}$. Initialise all the elements in the matrix M to 0 (zero).

Step 11: Calculate Elements of Matrix M

To calculate the value of $M_{ij}$ do the following three calculations:

(a) Put $x_i=y_j=0$ in f( ) and g( ), that is, remove all the terms in f( ) which contain $x_i$ and all the terms in g( ) which contain $y_j$. Replace the remaining variables in f( ) and g( ) with the symbol #, and rearrange their respective terms (sign included), treating them as character strings, in ascending (or, descending) order. Call the resulting strings of f( ) and g( ), respectively, $f_0( )$ and $g_0( )$. If the strings $f_0( )$ and $g_0( )$ match, increment the current value of $M_{ij}$ by 1.

(b) Put $x_i=y_j=1$ in f( ) and g( ), that is, remove all occurrences of $x_i$ and its immediately preceding multiplication operator from f( ) and do likewise for all occurrences of $y_j$ in g( ). Replace the remaining variables in f( ) and g( ) with the symbol #, and rearrange their respective terms (sign included), treating them as character strings, in ascending (or, descending) order. Call the resulting strings of f( ) and g( ), respectively, $f_1( )$ and $g_1( )$. If the strings $f_1( )$ and $g_1( )$ match, increment the current value of $M_{ij}$ by 1.

(c) Put $x_i=y_j=-1$ in f( ) and g( ), that is, remove $x_i$ and its immediately preceding multiplication operator from all the terms in f( ) which contain $x_i$ for each such term change its sign if an odd number of $x_i$s were removed from it, and do likewise for all occurrences of $y_j$ in g( ). Replace the remaining variables in f( ) and g( ) with the symbol #, and rearrange their respective terms (sign included), treating them as character strings, in ascending (or, descending) order. Call the resulting strings of f( ) and g( ), respectively, $f_{-1}( )$ and $g_{-1}( )$. If the strings $f_{-1}( )$ and $g_{-1}( )$ match, increment the current value of $M_{ij}$ by 1.

Step 12: If Any Element of M is Not 0 or 3, Exit

If the matrix M has elements, whose values are other than 0 or 3, then f( )≠g( ), and the algorithm ends, i.e. exit with condition false. This is because if f( ) and g( ) are equal then all the tests, a, b and c of Step 11, together should either fail or succeed for a given ($x_i$, $y_j$) pair. If the elements of M are either 0 or 3, go to the next step.

As an explanation of step 12, if two functions f( ) and g( ) are equivalent such that the variable $x_i$ in f( ) can correspond to the variable $y_j$ in g( ), then their respective strings $f_0( )$ and $g_0( )$ derived from test a of step 11 must obviously be identical to each other. Likewise for tests b the strings $f_1( )$ and $g_1( )$ must be identical and for test c the strings $f_{-1}( )$ and $g_{-1}( )$ must be identical. Thus, the element of M corresponding to these tests must be 1+1+1=3. Similarly, if f( ) and g( ) are equivalent, but $x_i$ in f( ) cannot correspond to $y_j$ in g( ), then all tests a, b, c in step 11 will fail and the element of M corresponding to these tests will be 0. It is important to note that these tests are carried out on f( ) and g( ) only when each of them is in its reduced form prior to the tests and F( )=G( ). This fact is important and forms the basis for making the string comparisons.

When two functions are not equivalent they can never lead to a matrix element whose value is 3 because at least one of the steps a, b, or c will result in a string mismatch. They may, however, lead to a matrix element whose value is 0. See Examples 2 and 3.

Below, 3 examples are provided to illustrate the calculation of the elements of M to support the above noted point.

EXAMPLE 1

Let $f(x, y)=x+x*y$ and $g(a, b)=a+a*b$ where it is clear that if x=a and y=b, then the functions f and g are equivalent, but not if x=b and y=a.

Consider the case when x=a when the functions are equivalent.

Following step 11(a) we put x=a=0 and get $f_0( )=0; g_0( )=0.$

Clearly, the strings of $f_0(\ )$ and $g_0(\ )$ will match and $M_{ij}=1$, where i refers to variable x and j refers to variable a.
Following step 11(b) we put x=a=1 and get $$f_1(\ )=1+y;\ g_1(\ )=1+b.$$

After substituting y and b with the character '#' and completing the remaining substeps of step 11(b) we will once again find that the strings of $f_1(\ )$ and $g_1(\ )$ will match and $M_{ij}=2$.
Following step 11(c) we put x=a=−1 and get $$f_{-1}(\ )=-1-y;\ g_{-1}(\ )=-1-b.$$

After substituting y and b with the character '#' and completing the remaining substeps of step 11(c) we will once again find that the strings of $f_{-1}(\ )$ and $g_{-1}(\ )$ will match and $M_{ij}=3$.
Similarly, the element of M corresponding to i=y and j=b will also evaluate to 3.
On the contrary, the element of M corresponding to x=b will evaluate to 0, as follows:
Following step 11(a) we put x=b=0 and get $$f_0(\ )=0;\ g_0(\ )=a.$$

Clearly, the strings of $f_0(\ )$ and $g_0(\ )$ will not match and $M_{ij}=0$, where i refers to variable x and j refers to variable b.
Following step 11(b) we put x=b=1 and get $$f_1(\ )=1+y;\ g_1(\ )=a+a.$$

After completing the remaining substeps of step (b) we will once again find that the strings of $f_1(\ )$ and $g_1(\ )$ will not match and $M_{ij}=0$.
Following step 11(c) we put x=b=−1 and get $$f_{-1}(\ )=-1-y;\ g_{-1}(\ )=a-a.$$

After completing the remaining substeps of step (c) we will once again find that the strings of $f_{-1}(\ )$ and $g_{-1}(\ )$ will not match and $M_{ij}=0$.
Similarly, the element of M corresponding to i=y and j=a will also evaluate to 0.

EXAMPLE 2

Let $f(x, y)=x+x*y+z$ and $g(a, b)=a+b*c+a$ where it is clear that the functions $f(\ )$ and $g(\ )$ are not equivalent. When two functions are not equivalent they can never lead to a matrix element whose value is 3.
Consider the case when x=a.
Following step 11(a) we put x=a=0 and get $$f_0(\ )=z;\ g_0(\ )=b*c.$$

Clearly, the strings of $f_0(\ )$ and $g_0(\ )$ will not match and $M_{ij}=0$, where i refers to variable x and j refers to variable a.
Following step 11(b) we put x=a=1 and get $$f_1(\ )=1+y+z;\ g_1(\ )=1+b*c+1.$$

After completing the remaining substeps of step 11(b) we will find that the strings of $f_1(\ )$ and $g_1(\ )$ will not match and $M_{ij}=0$.
Following step 11(c) we put x=a=−1 and get $$f_{-1}(\ )=-1-y+z;\ g_{-1}(\ )=-1+b*c-1.$$

After completing the remaining substeps of step 11(c) we will find that the strings of $f_{-1}(\ )$ and $g_{-1}(\ )$ will not match and $M_{ij}=0$, which is also the final value for this element.

Now consider the case when x=b. Following step 11(a) we put x=b=0 and get $$f_0(\ )=z;\ g_0(\ )=a+a.$$

Clearly, the strings of $f_0(\ )$ and $g_0(\ )$ will not match and $M_{ij}=0$, where i refers to variable x and j refers to variable b.
Following step 11(b) we put x=b=1 and get $$f_1(\ )=1+y+z;\ g_1(\ )=a+c+a.$$

After completing the remaining substeps of step 11(b) we will find that the strings of $f_1(\ )$ and $g_1(\ )$ will not match and $M_{ij}=0$.
Following step 11(c) we put x=b=−1 and get $$f_{-1}(\ )=-1-y+z;\ g_{-1}(\ )=a-c+a.$$

After completing the remaining substeps of step 11(c) we will find that the strings of $f_{-1}(\ )$ and $g_{-1}(\ )$ will not match and $M_{ij}=0$, which is also the final value for this element.
Similarly, other elements of M will all show that none of them have the value 3.

EXAMPLE 3

Let $f(x, y)=x+x*y+z$ and $g(a, b)=a+b+c$ where it is clear that the functions $f(\ )$ and $g(\ )$ are not equivalent. When two functions are not equivalent they can never lead to a matrix element whose value is 3.
Consider the case when x=b.
Following step 11(a) we put x=b=0 and get $$f_0(\ )=z;\ g_0(\ )=a+c.$$

Clearly, the strings of $f_0(\ )$ and $g_0(\ )$ will not match and $M_{ij}=0$, where i refers to variable x and j refers to variable b.
Following step 11(b) we put x=b=1 and get $$f_1(\ )=1+y+z;\ g_1(\ )=a+1+c.$$

After completing the remaining substeps of step 11(b) we will find that the strings of $f_1(\ )$ and $g_1(\ )$ will match and $M_{ij}=1$.
Following step 11(c) we put x=b=−1 and get $$f_{-1}(\ )=-1-y+z;\ g_{-1}(\ )=a-1+c.$$

After completing the remaining substeps of step 11(c) we will find that the strings of $f_{-1}(\ )$ and $g_{-1}(\ )$ will not match and $M_{ij}=1$, which is also the final value for this element.
Similarly, other elements of M will all show that none of them have the value 3 but they need not be calculated since even a single element whose value is neither 0 nor 3 in M is sufficient to show that the two functions are not equivalent.

The three steps (a), (b), (c) are heuristics. They were chosen because step (a) will remove terms containing a given variable, step (b) will delete a given variable from terms containing it, step (c), in addition to what step (b) does, will change the sign of terms which contain a given variable in odd multiples. The reduced strings of $f(\ )$ and $g(\ )$ will be affected differently in at least in one of the steps if $f(\ )$ is not equal to $g(\ )$, assuming that $F(\ )$ and $G(\ )$ were equal. These three steps appear to be sufficient for deciding whether $f(\ )$ and $g(\ )$ are equal or not. However, as a precaution, finally, $f(\ )$ and $g(\ )$ are compared with the appropriate substitution of variables given by a permutation to ensure that the result is indeed correct.

Step 13: If Any Row of M Does Not Contain 3, Exit

For each row, beginning with the i=1 row, scan the columns of the matrix for a 3. If the row is devoid of a 3, then f( )≠g( ), and the algorithm ends, i.e. exit with condition false.

Step 14: Exchange Columns of M

For each row, beginning with i=1 row, check the row's columns. For each column j>i in the ith row for which $M_{ij}=3$ exchange the contents of columns i and j in M (including the column labels). Note that the column numbering is not changed, only the contents of the columns and their labels are exchanged. Note also that the exchange operations amount to finding the permutation σ of degree n on the set $\{y_1, y_2, \ldots, y_n\}$.

Step 15: If M is Not Symmetric, Exit

Examine the resulting matrix M. If M is not symmetric then f( )≠g( ), and the algorithm ends, i.e. exits with condition false. If it is symmetric then go to Step 16.

Step 16: Set Up the Permutation σ

Set up the permutation σ, that is a correspondence between the elements of the variables set $\{x_1, x_2, \ldots, x_n\}$ and the variables set $\{y_1, y_2, \ldots, y_n\}$ on the basis of the diagonal of M. This can be done by going down the diagonal of M and, for each diagonal element, creating the variable labels pair $(x_i, y_k)$, where $y_k$ is the current column label of the i-th column.

Step 17: Compare f( ) and g( )

In g( ), now replace each occurrence of the variable $y_k$ by its corresponding $x_i$ for k=1 to n or, alternatively replace each occurrence of the variable $x_i$ by $y_k$ for i=1 to n in f( ). If in their reduced form, f( ) and g( ) are equivalent, then exit from the algorithm with condition true, else exit with condition false.

Step 18: Off-diagonal Elements with Value 3

If M has off-diagonal elements, which are 3s, it indicates that alternative permutations σ of degree n on the set $\{y_1, y_2, \ldots, y_n\}$ exist. This situation arises if f( ), and therefore g( ), is symmetric with respect to two or more of its variables. Let us call a column a 3-column if it has an off-diagonal 3 in any of its rows. An alternative permutation is obtained by exchanging the contents of such a 3-column with its symmetric counterpart on the other side of the diagonal (that is, if the 3-column chosen is the j-th column then its symmetric counterpart will be the (n−j)-th column).

FURTHER EXAMPLES

EXAMPLE 4

Let $$f(x, y, z) = +0.100000e+01*x+0.400000e+01*x*y+0.200000e+01*x*y*z+0.300000e+01*y*z$$

and $$g(a, b, c) = +0.100000e+01*b+0.400000e+01*b*c+0.200000e+01*a*b*c+0.300000e+01*a*c$$

(The blank spaces on the right hand side of the identities have been introduced for visual clarity here, the reduced form does not have them.) By inspection we can deduce that if x=b, y=c, z=a, then the two functions are indeed identical. Let us see if the algorithm described above will also provide the same conclusion.

Step 4.

Since the symbol sets $\{x, y, z\}$ and $\{a, b, c\}$ are different, move to Step 5.

Step 5.

Since n≠1, move to Step 8.

Step 8.

Substitute every variable in f(x, y, z) and g(a, b, c) with the character # to obtain $$F = +0.100000e+01*\#+0.400000e+01*\#*\#+0.200000e+01*\#*\#*\#+0.300000e+01*\#*\#$$

and $$G = +0.100000e+01*\#+0.400000e+01*\#*\#+0.200000e+01*\#*\#*\#+0.300000e+01*\#*\#$$

Rearrange the terms in ascending order to obtain $$F = +0.100000e+01*\#+0.200000e+01*\#*\#*\#+0.300000e+01*\#*\#+0.400000e+01*\#*\#$$

and $$G = +0.100000e+01*\#+0.200000e+01*\#*\#*\#+0.300000e+01*\#*\#+0.400000e+*\#*\#$$

Step 9.

A string match between F and G will show that they match, so move to next step.

Step 10.

The initial matrix M

|   | a | b | c |
|---|---|---|---|
| x | 0 | 0 | 0 |
| y | 0 | 0 | 0 |
| z | 0 | 0 | 0 |

Step 11.

The final matrix M

|   | a | b | c |
|---|---|---|---|
| x | 0 | 3 | 0 |
| y | 0 | 0 | 3 |
| z | 3 | 0 | 0 |

Step 12.

The matrix M has no elements which are neither 0 or 3, so move to Step 13.

Step 13.

Each row of matrix M has a 3 so go to Step 14.

Step 14.

Exchange columns.

First and second columns

|   | b | a | c |
|---|---|---|---|
| x | 3 | 0 | 0 |
| y | 0 | 0 | 3 |
| z | 0 | 3 | 0 |

Second and third columns

|   | b | c | a |
|---|---|---|---|
| x | 3 | 0 | 0 |
| y | 0 | 3 | 0 |
| z | 0 | 0 | 3 |

Steps 15 to 17.

Note that the matrix M is diagonal (and hence also symmetric), and the diagonal relates the row labels with the column labels as x=b, y=c, z=a. If we substitute for a, b, c, respectively, by z, x, y in g( ), and use the reduction algorithm described in connection with FIG. 3, we will find that f( )=g( ).

EXAMPLE 5

Let $$f(x, y, z) = +0.100000e+01*x*x+0.100000e+01*x*y+0.100000e+01*y*y+0.100000e+01*z$$

and $$g(a, b, c) = +0.100000e+01*a*a+0.100000e+01*a*b+0.100000e+01*b*b+0.100000e01*c$$

By inspection we can deduce that if x=a, y=b, z=c, then the two functions are indeed identical. Alternatively, if x=b, y=a, z=c, then again the two functions are identical. Let us see if the algorithm described above will provide the same conclusions.

Step 4.

Since the symbol sets {x, y, z} and {a, b, c} are different, move to Step 5.

Step 5.

Since n≠1, move to Step 8.

Step 8.

Substitute every variable in f(x, y, z) and g(a, b, c) with the character # to obtain $$F = +0.100000e+01*\#*\#+0.100000e+01*\#*\#+0.100000e+01*\#*\#+0.100000e01*\#$$

and $$G = +0.100000e+01*\#*\#+0.100000e+01*\#*\#+0.100000e+01*\#*\#+0.100000e01*\#$$

Rearrange the terms in ascending order to obtain $$F = +0.100000e+01*\#+0.100000e+01*\#*\#+0.100000e+01*\#*\#+0.100000e+01*\#*\#$$

and $$G = +0.100000e+01*\#+0.100000e+01*\#*\#+0.100000e+01*\#*\#+0.100000e+01*\#*\#$$

Step 9.

A string match between F and G will show that they match, so move to Step 10.

Step 10.

The initial matrix M

|   | a | b | c |
|---|---|---|---|
| x | 0 | 0 | 0 |
| y | 0 | 0 | 0 |
| z | 0 | 0 | 0 |

Step 11.

The final matrix M

|   | a | b | c |
|---|---|---|---|
| x | 3 | 3 | 0 |
| y | 3 | 3 | 0 |
| z | 0 | 0 | 3 |

Step 12.

The matrix M has no elements which are neither 0 or 3, so move to Step 13.

Step 13.

Each row of matrix M has a 3 so go to Step 14.

Step 14.

Since the matrix M already appears in symmetric form with all its diagonal elements containing a 3, exchange of columns is implicitly complete.

Steps 15 to 18.

Note that in matrix M the diagonal relates the row labels with the column labels as x=a, y=b, z=c. If we substitute for a, b, c, respectively, by x, y, z in g( ), again using the reduction algorithm described with reference to FIG. 3 of the drawings, it will be found that f( ) g( ). Also notice that we can exchange columns 1 and 2 and obtain

|   | b | a | c |
|---|---|---|---|
| x | 3 | 3 | 0 |
| y | 3 | 3 | 0 |
| z | 0 | 0 | 3 |

And thence, x=b, y=a, z=c. So both the solutions are found by the algorithm.

It will be understood that the invention is not limited to the specific embodiments described above but includes modifications and developments within the purview of those skilled in the art and limited solely by the following claims.

What is claimed is:

1. A method for compiling computer-readable source code, wherein the apparatus processes first and second algebraic functions of the source code in order to produce an optimized computer program, the method including the steps of:

(a) determining the symbol sets of the two functions;
   (b) forming a matrix having a row for each symbol of one function and a column for each symbol of the other function;
   (c) subjecting the functions to predetermined tests and incrementing the entries in the matrix in accordance with the results of said tests; and
   (d) testing the matrix against predetermined rules for the symmetry of the matrix.

2. A method according to claim 1, including, between steps (a) and (b), carrying out the step of:

(e) comparing said symbol sets to determine whether they contain the same numbers of symbols.

3. A method according to claim 1, the method being operable for analysing a relationship between said first and second functions and comprising the steps of:
   (f) in each term in each function, replace each variable name in that term with a predetermined symbol to form two character strings F( ) and G( ) each composed of sub-stings corresponding to respective terms of the respective function;
   (g) arranging the sub-strings of each string in a like predetermined order; and
   (h) comparing the strings one with another to determine equivalence of the two functions.

4. A method according to claim 3, including taking each variable $x_i$ of the first function $f(x_i, x_2, \ldots, x_n)$ and running through variables $y_j$ of the second function $g(y_1, y_2, \ldots, y_n)$ one-by-one and carrying out the steps of:
   (i) removing all the terms in the first function which contain $x_i$ and all the terms in the second function which contain $y_j$ and, in each remaining term of each function, replacing each variable with a predetermined symbol and rearranging said terms in a predetermined order to form two character strings $f_0(\ )$ and $g_0(\ )$;
   (j) replacing each variable $x_i$ and $y_j$ by the value 1, replacing each remaining variable with a single predetermined symbol, and rearranging the terms of the functions in a predetermined order as two character strings $f_1(\ )$ and $g_1(\ )$;
   (k) replacing each variable $x_1$ and $y_j$ byte value $-1$, replacing each remaining variable with a single predetermined symbol, and rearranging the terms of the functions in a predetermined order as two character strings $f_{-1}(\ )$ and $g_{-1}(\ )$;
   (l) carrying out respective character string matching operations to determine if $f_0(\ )$ is identical to $g_0(\ )$, if $f_1(\ )$ is identical to $g_1(\ )$, and if $f_{-1}(\ )$ is identical to $g_{-1}(\ )$.

5. A method according to claim 4, comprising the steps of:
   (m) inspecting variables in the sets of variables $\{x_1, x_2, \ldots, x_n\}$ and $\{y_1, y_2, \ldots, y_n\}$ of the respective expressions f( ) and g( ) to determine if they are identical;
   (n) if the variable sets are not identical, and if n=1, putting $y_1 = x_i$, in g( ) and determining if the swings of f( ) and g( ) now match;
   (p) replacing each of the variables in f( ) and g( ) with the symbol #, and rearranging the terms (sign included) in ascending (or, descending) order to produce new strings F( ) and G( ).

6. A method for compiling computer-readable source code, wherein the apparatus processes first and second algebraic functions f( ) and g( ) of the source code in order to produce an optimized computer program, the method comprising the steps of:
   (a) forming a matrix M with n rows and n columns, wherein the algebraic functions have respective symbol sets $\{x_1, x_2, \ldots, x_n\}$ and $\{y_1, y_2, \ldots, y_n\}$, the symbol sets having equal numbers of symbols, and wherein the matrix M is made up of elements $M_{ij}$ corresponding to respective pairs of said symbols $x_i$ and y$M_{ij}$ being calculated by:
   (i) initialising the values of $M_{ij}$ to zero;
   (ii) puffing $x_i=0$ in f( ) and $y_j=0$ in g( ) and replacing each other variable in f( ) and g( ) with a predetermined string character, then arranging terms of f( ) and g( ) in ASCII order and comparing them and, if they match, incrementing the current value of $M_{ij}$;
   (iii) putting $x_i=1$ in f( ) and $y_j=1$ in g( ) and replacing each other variable in f( ) and g( ) with a predetermined string character, ten arranging the terms of f( ) and g( ) in ASCII order and comparing tern and, if they match, incrementing the current value of $M_{ij}$;
   (iv) putting $x_i=-1$ in f( ) and $y_j=-1$ in g( ) and replacing each other variable in f( ) and g( ) with a predetermined string character, then arranging the terms of f( ) and g( ) in ASCII order and comparing them and, if they match, incrementing the current value of Mc$_{ij}$;
   (b) inspecting the matrix M to determine if every element $M_{ij}$ is either a zero or a three and that each row of the matrix M contains at least one three;
   (c) for each element $M_{ij}$ which has the value three and satisfies a relationship j>i, exchange contents of columns i and j one with another;
   (d) inspecting the matrix M with the exchanged columns to determine if M is symmetrical.

7. Apparatus for compiling computer-readable source code, wherein the apparatus processes first and second algebraic functions; of the source code in order to produce an optimized computer program, the apparatus comprising:
   a) a processor;
   b) a storage device coupled to the processor for storing the source code and compiler program instructions, wherein the processor is operable with the compiler program instructions to perform the steps of:
   (i) determining symbol sets of the two functions;
   (ii) forming a matrix having a row for each symbol of one function and a column for each symbol of the other function;
   (iii) subjecting the functions to predetermined tests and incrementing elements in the matrix in accordance with results of said tests; and
   (iv) testing the matrix against predetermined rules for symmetry of the matrix.

8. Apparatus according to claim 7, wherein step (i) includes identifying within said program first and second algebraic functions $f(x_1, x_2, \ldots, x_n)$ and $g(y_1, y_2, \ldots, y_n)$, and step (ii) includes in each term in each function, replacing each variable name $x_1, x_2, \ldots, x_n$ and $y_1, y_2, \ldots, y_n$ in that term with a single predetermined symbol to form two character strings F( ) and G( ) each composed of sub-strings corresponding to respective terms of the respective function and arranging sub-strings of each string in a like predetermined order.

9. A program product comprising a body of software code for determining the equivalence of two algebraic functions, the software code including:
   (a) a code portion for determining symbol sets of the two functions;
   (b) a code portion for forming a matrix having a row for each symbol of one function and a column for each symbol of the other function;
   (c) a code portion for subjecting the functions to predetermined tests and incrementing elements in the matrix in accordance with results of said tests; and
   (d) a code portion for testing the matrix against predetermined rules for symmetry of the matrix.

10. A product according to claim 9, including a code portion for comparing said symbol sets to determine whether they contain the same numbers of symbols.

* * * * *